United States Patent [19]

Hill

[11] 4,228,654

[45] Oct. 21, 1980

[54] HEAT RECUPERATIVE ENGINE WITH IMPROVED RECUPERATOR

[76] Inventor: Craig C. Hill, Winter St., Lincoln, Mass. 01773

[21] Appl. No.: 967,384

[22] Filed: Dec. 7, 1978

[51] Int. Cl.³ .............................................. F02G 1/04
[52] U.S. Cl. ...................................... 60/508; 60/682; 165/52
[58] Field of Search ................. 60/682, 508, 516, 519, 60/525; 165/52, 105, 120; 123/142.5 R

[56] References Cited

U.S. PATENT DOCUMENTS

| | | | |
|---|---|---|---|
| 3,763,649 | 10/1973 | Wahnschaffe | 60/519 |
| 3,823,559 | 7/1974 | Foret | 60/508 |
| 4,009,573 | 3/1977 | Satz | 60/519 |
| 4,138,847 | 2/1979 | Hill | 60/508 |

Primary Examiner—Stephen A. Kreitman
Attorney, Agent, or Firm—Wolf, Greenfield & Sacks

[57] ABSTRACT

A heat recuperative engine is provided with an improved heat recuperator having two branches. Each branch houses a pair of meshed gearlike rotors that extend across the chamber of the housing to form a blockage between the inlet and outport ports of the chamber. The rotors are formed similarly to external spur gears and have a central cylindrical body bearing radially projecting teeth or lobes which mesh to form a sealing line of contact that maintains the blockage when the rotors turn. Each rotor of the pair has its projecting teeth or lobes fitting closely with a segment of the chamber wall in which an array of heat pipes is embedded. The spaces between adjacent lobes of a rotor provide constant volume enclosures as the lobes sweep around the closely fitting chamber wall segment and carry working medium from the inlet to the outlet side of the chamber. The heat pipes extend between the two branches so that the hotter working medium swept around by the rotors in one branch gives up heat to the heat pipes which transfer that heat to the cooler working medium swept around by the rotors in the other branch. Consequently, the working medium in one branch is cooled while it is confined in moving constant volume enclosures and the working medium in the other branch is heated while it is confined in moving constant volume enclosures.

3 Claims, 4 Drawing Figures

HEAT RECUPERATIVE ENGINE WITH IMPROVED RECUPERATOR

FIELD OF THE INVENTION

This invention relates in general to heat engines and more particularly pertains to a heat recuperative engine whose cycle of operation has a compression phase, a constant volume heat variation phase of substantial duration, an expansion phase, and a second constant volume heat variation phase of substantial duration.

BACKGROUND OF THE INVENTION

My earlier patent application, Ser. No. 814,388, filed July 11, 1977, now U.S. Pat. No. 4,138,847, describes a class of heat engines employing a constant volume heat recuperator having two branches arranged to transfer heat between working medium confined in a moving constant volume chamber orbiting in one cavity and working medium confined in another moving constant volume chamber that orbits in the opposite direction in a second cavity. The heat recuperator utilizes heat transfer means such as heat pipes within the walls of the cavities to effect an exchange of heat between the working medium in the two cavities. That arrangement causes the hotter working medium to be cooled at constant volume as it is swept through one cavity and causes the cooler working medium to be heated at constant volume as it is swept through the other cavity.

This application describes an improvement on the recuperator devices disclosed in my earlier patent application. All of the embodiments disclosed in that earlier application employ some type of rotary positive displacement mechanism in the recuperator which requires a blocking means within each cavity to prevent the gas that has been recuperatively heated or cooled in a rotating constant volume chamber from being swept around again and again in the same orbit. Associated with the rotary positive displacement mechanisms disclosed in my earlier application is the problem of preventing or minimizing leakage of the confined working medium back to the intake side of the cavity. All of the rotary positive displacement mechanisms there disclosed either utilize orbiting radially sliding vanes that are drawn out of the way into pockets in a rotor as the vanes approach a blocking means fixed in the cavity or utilize pistons orbiting in a fixed circular path and a slidable blocking means in the cavity that is retracted out of the path as each of the orbiting pistons nears the blocking means. Thus, in addition to the rotary motion of the vanes or pistons, both those types of positive displacement mechanisms require an additional sliding motion by either the vanes or the blocking means and consequently the arrangements are somewhat more mechanically complex than would be the case if only purely rotary motion occurred.

OBJECT OF THE INVENTION

The primary object of the present invention is to provide a heat recuperative engine having an improved constant volume heat recuperator which utilizes a positive displacement arrangement in which the movable positive displacement members have only rotary motion and the need for a separate blocking means is eliminated. In other respects, the general principles of recuperator operation and construction remain as described in my earlier patent application.

SUMMARY OF THE INVENTION

The invention resides in an improved heat recuperator for a heat engine. The improved heat recuperator has two branches, each with its own inlet and outlet ports. In each branch is a chamber housing a pair of meshed gearlike rotors that extend across the chamber to form a blockage between the inlet and outlet ports. The rotors are similar to external spur gears with radially projecting toothlike lobes that mesh to form a sealing line of contact that maintains the blockage as the rotors turn. Each rotor of the pair has its lobes fitting closely with a substantially semi-circular segment of the chamber wall in which an array of heat pipes is embedded. Because of the close fit, the spaces between adjacent lobes of a rotor provide enclosures of constant volume as the lobes sweep around the closely fitting chamber wall segment. As the rotors rotate, working medium is confined in the constant volume enclosures and is carried past the array of embedded heat pipes from the inlet side of the chamber to the outlet side of the chamber where the working medium is released. The heat pipes extend between the two branches of the recuperator and enable heat to be carried from the hotter branch to the cooler branch. Consequently, the hotter working medium that is swept by the rotors past the heat pipes in one branch gives up heat to the heat pipes which transfer that heat to the cooler working medium swept around by the rotors in the other branch. By appropriate arrangement of the array of heat pipes and the proper direction of rotation of the rotors, the cooler working medium is progressively heated while maintained at constant volume as it is swept from the inlet side to the outlet side of the chamber and the hotter working medium is progressively cooled while maintained at constant volume as it is swept around in the other branch of the recuperator.

DETAILED DESCRIPTION

Figure 1:
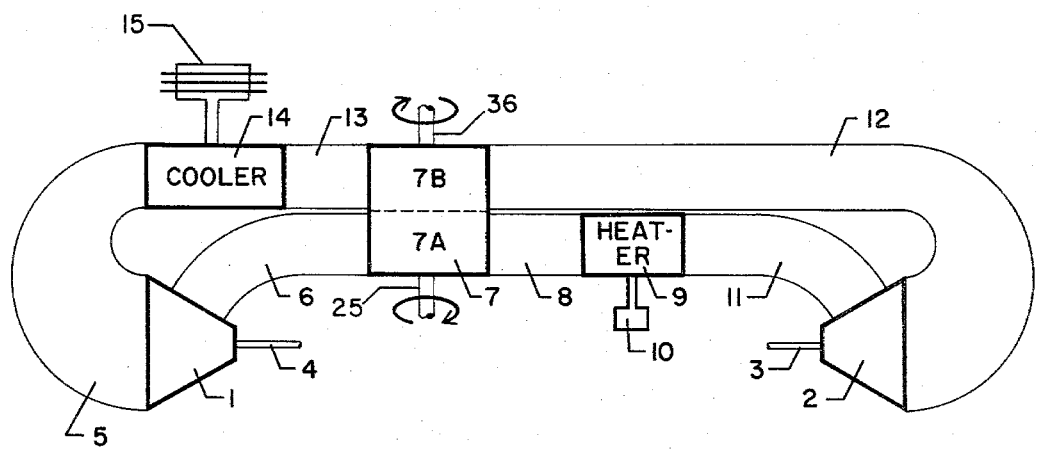
FIG. 1 is a diagram showing the scheme of a closed cycle heat recuperative engine utilizing the improved recuperator.

Referring now to the FIG. 1 diagram which schematically shows a closed cycle heat recuperative engine, a gas compressor 1 is driven by a turbine 2 having a power output shaft 3 which is coupled to the input shaft 4 of the gas compressor. Where necessary or desirable, a speed changing mechanism can be employed between the two shafts to enable the gas compressor to be driven at the appropriate speed. Compressor 1 has an inlet duct 5 through which the gas to be compressed is inducted. The compressed gas is delivered through an outlet duct 6 to the intake port of the branch 7A of a constant volume recuperator 7. The outlet of branch 7A of the recuperator is connected by a duct 8 to the inlet port of a gas heater 9. A burner 10 or some other external heat source is employed to provide heat to the heater. The hot gas flowing out of heater 9 flows through duct 11 to the inlet of turbine 2 and in expanding through the turbine causes the turbine to produce mechanical work at the turbine's output shaft 3. The expanded working medium is exhausted through the outlet of the turbine and flows through duct 12 to the inlet port of the cooling branch 7B of recuperator 7. After passing through the recuperator, the cooled gas flows through duct 13 to a cooler 14 where the gas is further cooled and then flows through duct 5 to the inlet of compressor 1.

In the operation of the FIG. 1 embodiment, a working medium such as hydrogen or air circulates through the engine in a thermodynamic cycle. Assuming the FIG. 1 embodiment heat engine is operated as a prime mover rather than as a heat pump, working medium at the lowest temperature and pressure in the cycle is inducted from duct 5 into the compressor 1 and is there compressed, preferably at a fairly low pressure ratio in the range of about 1.5 to about 4. A single stage compressor may be used or where greater efficiency is desired a multi-stage compressor having inter-cooling means between stages to reduce compression work in the later stages may be employed. The compressed working medium flows through duct 6 into the heating branch 7A of recuperator 7 where the compressed gas is heated at constant volume by heat obtained from the working medium passing through the cooling branch 7B of the recuperator. The heated compressed working medium then flows through duct 8 to the heater 9. In the heater, the gas temperature and gas pressure are further increased by heat from an external source 10. The working medium leaves the heater at the highest temperature and pressure reached in the thermodynamic cycle and flows at constant pressure through duct 11 to the inlet of turbine 2. In the turbine, the working medium is adiabatically expanded to cause power to be produced by the rotation of output shaft 3. The volume expansion ratio in turbine 2 is equal to the volume compression ratio in the compressor 1, so that the density of the expanded working medium exiting from the turbine into duct 12 is equal to the density of the working medium in duct 5 at the inlet to the compressor. Of course, the temperature of the expanded medium in duct 12 is considerably higher than the temperature of the compressed medium in duct 6. Heat exchange means in the recuperator cause the hotter medium swept through branch 7B at constant volume to give up heat to the cooler working medium swept in the opposite direction at constant volume through branch 7A. Consequently, the temperature of the working medium passing through branch 7B of the recuperator is lowered while the temperature of the working medium passing through branch 7A is raised by the heat exchanged between the two branches. Because the recuperator is less than 100% efficient, the temperature of the working medium exiting from branch 7B, although reduced in temperature, is still too high. The working medium is therefore passed through a constant volume cooler 14 where the medium's temperature and pressure are returned to the lowest temperature and pressure in the cycle by the transfer of heat from the medium to an external heat sink 15.

Although the embodiment schematically shown in FIG. 1 is indicated to have one recuperator stage per branch and but one expansion stage, it is feasible to extend the effective length of the recuperator by employing more than one stage per branch and it is also feasible to employ a multi-stage turbine having re-heating means between expansion stages. For the operation described above, the pressure-volume diagram of the closed cycle embodiment closely resembles that of an ideal Otto cycle with a very low compression and expansion ratio and with exhaust energy partly reclaimed by recuperation rather than lost in the blowdown period of the conventional Otto cycle. In this cycle, the temperature of the working medium after constant volume heating and adiabatic expansion is appreciably greater than the temperature of the working medium after compression and consequently heat exchange between the branches of the recuperator is thermally practicable.

Figure 2:
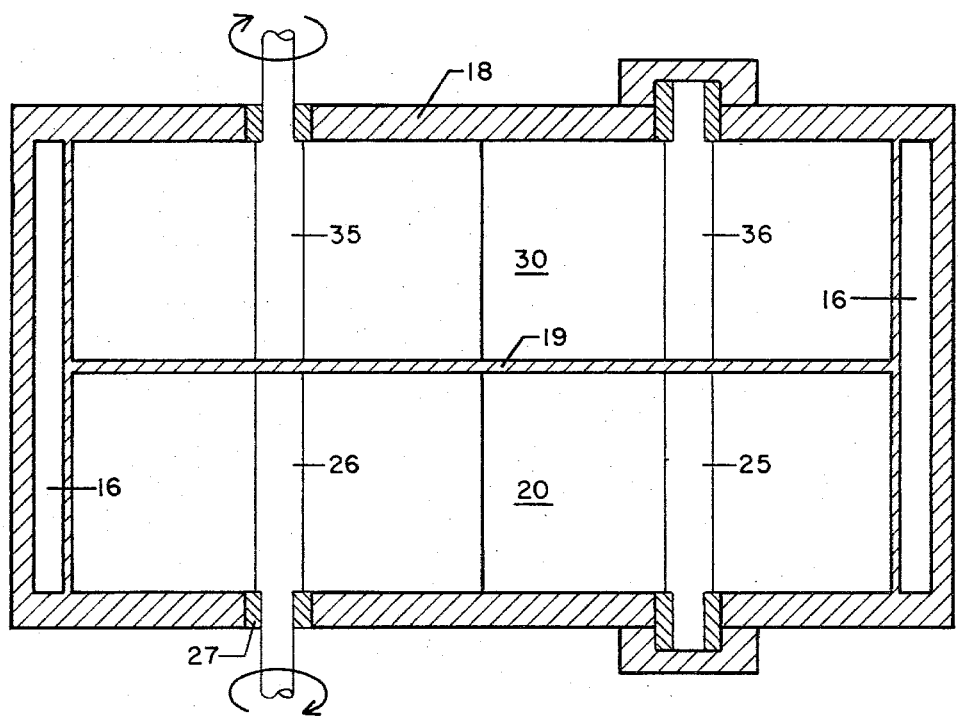
FIG. 2 is a sectional view showing the interior arrangement in both branches of the improved recuperator.
Figure 3:
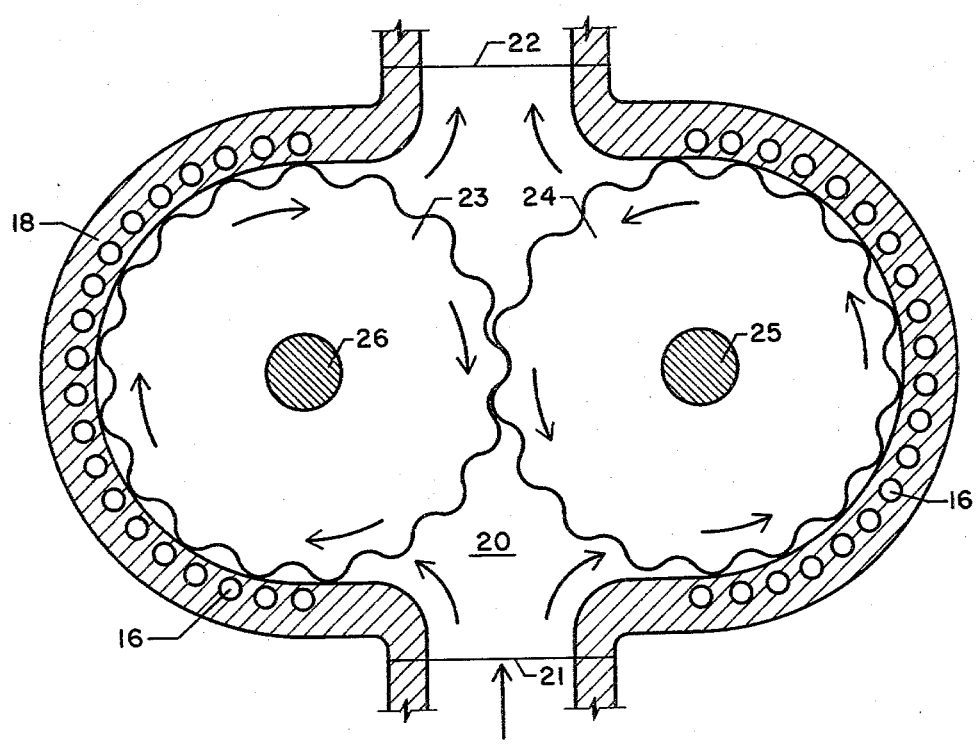
FIG. 3 is a sectional view showing the interior arrangement in the cooling branch of the recuperator.
Figure 4:
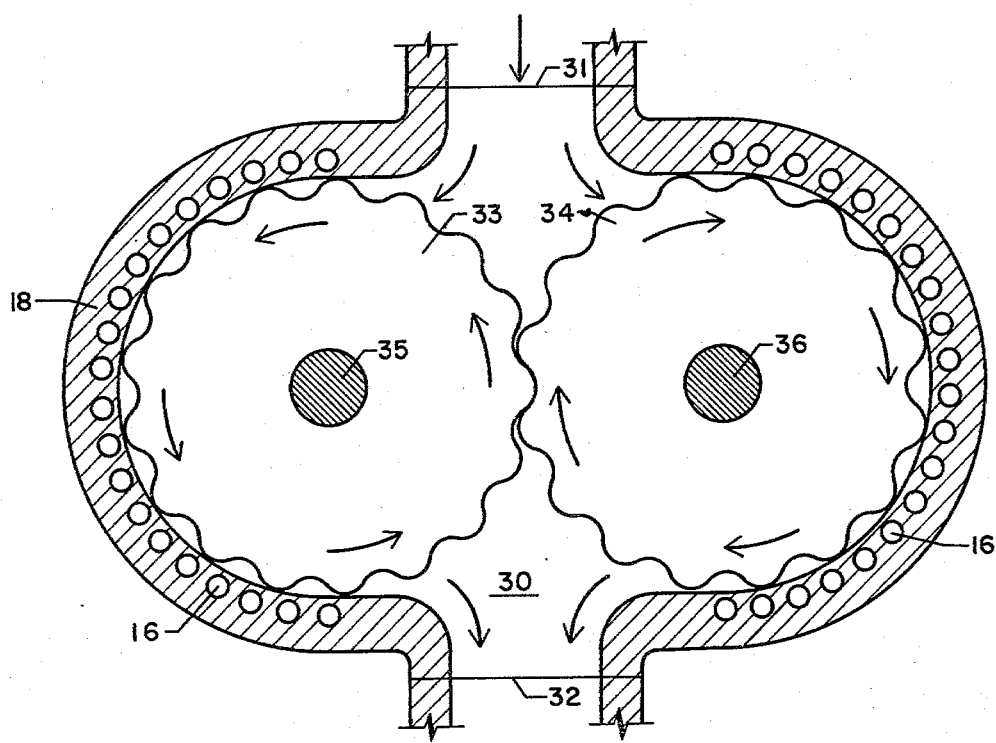
FIG. 4 is a sectional view showing the interior arrangement in the heating branch of the recuperator.

FIGS. 2, 3, and 4 depict the preferred embodiment of the improved recuperator. The casing 18 of the recuperator, as shown in FIG. 2, provides cavities 20 and 30 separated by a partition wall 19. Cavity 20, shown in FIG. 3, has an inlet port 21 and an outlet port 22. Disposed in cavity 20 are a pair of gearlike rotors 23, 24 whose axial ends fit closely against the walls of the cavity to minimize gas leakage. The rotors, as indicated in FIG. 3, are arranged to mesh and provide rolling contact which prevents the passage of gas directly from the input port to the output port. Rotor 24 is free to rotate on shaft 25 whereas rotor 23 is splined to rotate with shaft 26. Shaft 26, as shown in FIG. 2, is journalled in and extends through a bearing 27 in casing 18. When shaft 26 is driven in the clockwise direction as viewed in FIG. 3, rotor 24 is driven in the counterclockwise direction. The sidewalls of cavity 20 are semicircular with each semicircle being concentric with the rotor housed in that side of the cavity and having a radius only very slightly greater than the maximum radius of the rotor so that the lobes or teeth of the rotor move in very close proximity to the semicircular wall as the rotor turns. Consequently, when shaft 26 is turned, rotors 23 and 24 rotate and working medium entering cavity 20 from inlet port 21 becomes confined in substantially closed constant volume chambers formed by the spaces between the lobes of the rotors when those lobes are in contact with or very nearly in contact with the semicircular walls of the casing. The working medium trapped in the constant volume chambers of rotor 23 is swept clockwise around the periphery of cavity 20 whereas the working medium trapped in the constant volume chambers of rotor 24 is swept counterclockwise around that cavity's periphery. The swept working medium is discharged by both rotors in the space adjacent to the outlet port 22 and the working medium then is exhausted through that port into the duct leading to heater 9. Working medium swept from the inlet to the outlet of cavity 20 is prevented from recirculating back to the inlet by the continuous sealing line of contact maintained between the lobes of the rotating rotors. Although some gas leakage across the sealing line may occur, the rate of leakage can be very small compared to the total gas flow if the rotational speed of the rotors is high, the pressure difference between the inlet and outlet is moderate, and the rotors are carefully constructed to provide rolling contact. A lubricant sealer may be employed to maintain the seal while reducing friction.

Referring now to FIG. 4, the cavity 30 has an inlet port 31, an exhaust port 32, and houses a similar pair of gearlike rotors 33 and 34. Rotor 33 is attached to shaft 35 so that both rotate as a unit. The lobes of rotor 34 mesh with the lobes of rotor 33 but rotor 34 is free to turn on its shaft 36. As viewed in FIG. 4, rotor 33 is driven to rotate in the counterclockwise direction and consequently rotor 34 is driven in the clockwise direction. In other respects, the arrangement in cavity 30 is similar to that in cavity 20.

As depicted in the drawings, cavities 20 and 30 are shown to be substantially congruent in cross section and axially in line so that the semicircular sidewall of cavity 20 that is swept by the lobes of rotor 23 is aligned with the semicircular sidewall of cavity 30 that is swept by the lobes of rotor 33 and the semicircular sidewall of cavity 20 that is swept by the lobes of rotor 24 is aligned with the semicircular sidewall of cavity 30 that is swept by the lobes of rotor 34. An array of heat pipes 16 is disposed within the casing 18 adjacent to the internal surface of the semicircular walls. Preferably, each heat pipe axially extends the axial length of cavities 20 and 30, as shown in FIG. 2. When the engine embodiment is a prime mover, the condensing ends of the heat pipes are adjacent to cavity 20 and the evaporating ends are adjacent to cavity 30. Shafts 26 and 35 are made to turn in opposite directions. Although no means for driving those shafts are illustrated, it is evident that power obtained from the output shaft 3 of the turbine can be employed, through a power transmission mechanism, to drive shafts 26 and 35. Inasmuch as shafts 26 and 35 rotate in counter directions, the direction of gas flow is also oppositely directed in the two cavities as indicated by the arrows in FIGS. 3 and 4.

Although the axial lengths of the rotors in cavity 20, as shown in FIG. 2, are illustrated as being equal to the axial lengths of the rotors in cavity 30, this need not be the case. Although the mass flow through the two branches of the recuperator is equal, volume flow through the branches is not equal, because compressed working medium is swept through the other branch. Accordingly, in order to accomodate the lower density and greater volume of the working medium flowing through branch 7B in cavity 30, either the axial length of the rotors may be increased to increase the volume flow or the speed of the rotors 33 and 34 may be increased, or both axial length and rotor speed may be increased together, making both the length and speed of rotors 33 and 34 greater than the length and speed of rotors 23 and 24 in cavity 20, branch 7A, causing the volume flow through branch 7B to be greater than flow through branch 7A, proportionally to the volume expansion ratio in the turbine 2.

The initially hotter working medium exhausted from the turbine flows into the inlet port 31 of the recuperator cooling branch and is swept in the constant volume chambers of rotors 33 and 34 around the periphery of cavity 30. The temperature of the hot working medium in the constant volume chambers progressively decreases in the direction of peripheral circulation as the working medium loses heat by convection to the cooler cavity walls. Heating of the cavity walls causes the saturated working fluid in the array of heat pipes 16 to evaporate at progressively lower temperatures in the direction of gas sweep. In cavity 20, the colder working medium from the compressor 1 flows through inlet port 21 into cavity 20 and is swept peripherally around that cavity in the constant volume chambers formed by the lobes of rotors 23 and 24. The direction of sweep in cavity 20 is opposite to the direction of sweep in cavity 30. Inasmuch as the walls of cavity 20 are continuously heated by heat pipes 16 which transfer heat obtained from cooling of the working medium in cavity 30 the working medium becomes progressively hotter as it is swept around the periphery of cavity 20 toward outlet port 22. Because the working medium just entering cavity 20 is colder than the working medium just leaving cavity 30, the working medium swept at constant volume around the periphery of cavity 20 is heated by forced convection to progressively higher temperatures. Consequently, a continuous recuperative heat exchange is effected between the working medium confined in the oppositely rotating constant volume chambers in the two chambers and the efficiency of the engine therefore is higher than that of an otherwise similar engine having the same cyclic temperature and pressure values but lacking such a constant volume recuperator.

In FIGS. 3 and 4, rotors 23, 24 and rotors 33, 34 are illustrated as having lobes which mesh to form a continuous sealing line of contact. The lobes constitute radially projecting external spurs borne on a cylindrical wheel similarly to the gear teeth on an external spur gear and consequently within the term external spur rotor are included both multilobed rotors with epicycloidal profiles like those employed in Roots pumps and also external spur gears of all types which provide a substantially continuous line of sealing contact between the rotors as they rotate.

Although a "Roots Pump" type of recuperator has been described as part of a prime mover heat engine, it will be clear to those versed in the art of heat pumps that the recuperator can easily be adapted for use in a heat pump of the type in which the working medium in the pump is not condensed during the cycle. Further, the FIG. 1 embodiment can be modified to operate as an open cycle engine, either as an internal combustion engine or as an engine employing heat from an external source to heat the working medium to a higher temperature than it reaches in the recuperator. A constant volume heater suitable for use in the FIG. 1 embodiment can be constructed in the manner of a single branch of the Roots pump type recuperator. In such a heater, the peripheral walls of the cavity can be heated by an external source heater rather than by internal heat transfer from the engine working medium. For example, hot gases can be forced by a blower through passages in the semicircular walls of the cavity, thus heating the walls to a high temperature and heating the compressed working medium in the rotating constant volume chambers between the rotor spurs by forced convection. Alternatively, the heater can be constructed as a constant volume internal combustion open cycle device by employing a fuel injector to spray a small quantity of fuel into each passing chamber and utilizing an igniter such as a spark device or a highly heated surface to ignite the fuel and cause combustion to occur in the constant volume chambers so that the temperature and pressure of the working medium is raised. Of course, other kinds of constant volume combustion chambers may be employed.

An open cycle engine has some potential advantage over a closed cycle engine, because fresh working medium at the ambient temperature is inducted into the engine, and thus no cooler is required after the regenerator. This fact potentially increases the engine's achievable efficiency, since in a closed cycle engine the lowest operating temperature must be higher than ambient temperature in order for the cooler to operate practically. Operating the engine as an internal combustion engine also has certain potential advantages, because higher maximum temperatures are probably more easily achieved in such a case.

I claim:

1. In an engine of the type having (1) compression means for compressing a fluid working medium, (2) means for heating the compressed fluid working medium, and (3) work producing means for inducting the compressed heated fluid working medium and producing work by expansion of the working medium, the improvement of a rotary positive displacement mechanism utilizing the expanded working medium exhausted from the work producing means to heat compressed working medium prior to its induction into the work producing means, the rotary positive displacement mechanism comprising (a) a housing having a first chamber with an inlet port for admitting compressed fluid working medium and an outlet port, (b) a pair of external spur rotors disposed for rotation in the first chamber, the external spurs being meshed and the rotors extending across the chamber to form a blockage between the inlet and outlet ports, (c) each of the spur rotors having its external spurs fitting closely with a segment of the chamber wall having embedded heat pipes forming an array around an appreciable extent of the chamber wall, the spaces between adjacent external spurs on a spur rotor providing constant volume enclosures as the external spurs sweep around the closely fitting chamber wall segment, (d) the housing having a second chamber adjacent to the first chamber, the second chamber having an inlet port for admitting expanded working medium exhausted from the work producing means and having an outlet port, (e) a second pair of external spur rotors disposed for rotation in the second chamber, the external spurs of the second pair being meshed and the rotors extending across the second chamber to form a blockage between the inlet and outlet ports, (f) means for driving the first and second pairs of rotors to cause the first pair of rotors to rotate in directions counter to those of the corresponding rotors of the second pair, (g) each of the rotors of the second pair having its external spurs fitting closely with a segment of the chamber wall having embedded in it extensions of the heat pipes embedded in the corresponding wall segment of the first chamber, the spaces between adjacent external spurs on a rotor providing constant volume enclosures as the external spurs sweep around the closely fitting wall segment whereby the heat pipes effect recuperative heat exchange between compressed working medium confined in the constant volume enclosures of the rotors in the first chamber and the expanded working medium confined in the constant volume enclosures of the rotors in the second chamber.

2. The improvement according to claim 1 wherein the first and second chambers are side by side and are separated by an intervening wall.

3. The improvement according to claim 1 wherein the array of heat pipes is arranged to cause working medium confined in the constant volume enclosures of the rotors in one of the chambers to be progressively heated as those rotors turn while the working medium confined in the constant volume enclosures of the rotors in the other of those chambers is progressively cooled as the rotors turn.

* * * * *